United States Patent [19]
Lacour et al.

[11] Patent Number: 4,495,631
[45] Date of Patent: Jan. 22, 1985

[54] GAS LASER IN WHICH THE GAS IS EXCITED BY CAPACITOR DISCHARGE

[75] Inventors: Bernard Lacour, Marcoussis; Marc Maillet, Massy; Olivier de Witte, Gif-sur-Yvette; Chantal Vannier, Saint-Michel sur Orge, all of France

[73] Assignee: Compagnie Generale D'Electricite, Paris, France

[21] Appl. No.: 349,105

[22] Filed: Feb. 16, 1982

[30] Foreign Application Priority Data

Feb. 16, 1981 [FR] France .............................. 81 02974
Aug. 31, 1981 [FR] France .............................. 81 16542

[51] Int. Cl.³ .......................................... H01S 3/097
[52] U.S. Cl. ..................................... 372/38; 372/83; 372/86; 372/87; 372/88
[58] Field of Search ...................... 372/81, 82, 83, 85, 372/86, 87, 88, 38

[56] References Cited

FOREIGN PATENT DOCUMENTS

| 2144141 | 2/1973 | France . |
| 2356297 | 1/1978 | France . |
| WO80/01439 | 7/1980 | PCT Int'l Appl. . |
| 1350034 | 4/1974 | United Kingdom . |
| 1540513 | 2/1979 | United Kingdom . |

OTHER PUBLICATIONS

Papakin et al., "Metal-Ceramic Discharge Chamber for a Nitrogen Laser with Transverse Excitation", *Instrum. & Exp. Tech.* (USA), vol. 22, No. 1, Pt. 2, (Jan.-Feb. 1979), (Publ. Aug. 1979), pp. 210-211.

Danilova et al., "Laser Action in Para-Quaterphenyl Vapor Pumped by XeCl* Laser Radiation", *Sov. J. Quantum Electron*, 10(5), May 1980, pp. 631-632.

Dynamic Power Supplies for TEA Lasers by R. Coisson and E. Rancan Rev. Sci. Instrum. vol. 49, No. 11, Nov. 1978 NY US pp. 1601-1602.

*Primary Examiner*—James W. Davie
*Attorney, Agent, or Firm*—Sughrue, Mion, Zinn, Macpeak & Seas

[57] ABSTRACT

A gas laser in which the gas is excited by laser discharge, said laser including two capacitors formed by two parallel metal plates (2, 3) between which two dielectric parts (4,5) are spaced apart to form a passage (6) which contains the laser gas. It further includes a transformer (13) whose secondary winding (12) is connected to the plates and whose primary winding (14) is connected in series with a capacitor (15), means (17) for charging and capacitor and a thyristor (16) for discharging the capacitor in the primary winding. Application to exciting gas lasers in which the gas contains a dye stuff.

8 Claims, 4 Drawing Figures

GAS LASER IN WHICH THE GAS IS EXCITED BY CAPACITOR DISCHARGE

The present invention relates to a gas laser in which the gas is excited by a capacitor discharge.

BACKGROUND OF THE INVENTION

A known gas laser of this type is described in published French patent application No. 2,356,297 of Jan. 20, 1978, in the name of Battelle Memorial Institute. Said laser includes in particular: an optical resonant cavity disposed along an axis and filled with active gas; two electrodes in contact with the active gas and connected together by an induction winding and disposed on opposites sides of the axis; two capacitors each having a dielectric member and two plates, each electrode constituting a capacitor plate; and a circuit for charging the capacitors. The two electrodes are constituted by juxtaposed plates whose edges as well as the dielectric members delimit a laser passage disposed along the axis and containing the active gas. Said laser is triggered by means of a spark unit whose electrodes are connected to respective plates of the capacitors.

Such a laser has two main drawbacks.

Firstly, it is necessary to frequently adjust the distance between the electrodes of the spark unit and even to replace said electrodes. Poor reliability and short service life are the result in both cases.

Secondly, the plasma which is set up in the spark unit each time the laser is triggered is extinguished after a relatively long interval: it is therefore impossible to trigger the laser very frequently, i.e. at a frequency of more than 10 to 50 kHz in practice.

Preferred embodiments of the present invention mitigate these drawbacks and provide a gas laser in which the gas is excited by capacitor discharge, it being possible to make said laser operate at a higher triggering frequency and said laser being more reliable.

SUMMARY OF THE INVENTION

The present invention provides a gas laser in which the gas is excited by discharges from capacitors, said laser comprising:

an optical resonant cavity disposed along an axis and containing an active laser gas;

two opposite electrodes in contact with the active gas and disposed one on either side of said axis;

two capacitors each having a dielectric member and two plates, each electrode constituting one plate of a capacitor, the dielectric members and the electrodes delimiting a laser passage disposed along said axis and containing the active gas; and a capacitor charging circuit, wherein:

the laser includes two metal plates each having a middle portion located between two adjacent end parts, these plates being disposed facing each other, their middle portions being in contact with the active medium and forming the electrodes, the end parts forming the plates of two parallel-connected capacitors; and wherein the charging circuit comprises:

a transformer whose primary winding is connected in series with a capacitor and whose secondary winding ends are connected to the two plates respectively;

a source of electric current to charge the capacitor; and means for controlling the discharge of the capacitor in the primary winding so as to generate an induced current in the secondary winding which induced current is capable of charging the capacitors so as to set up an electric discharge between the electrodes, said discharge exciting the gaseous active medium to form a laser beam.

BRIEF DESCRIPTION OF THE DRAWINGS

Particular embodiments of the invention are described by way of example with reference to the accompanying drawings in which.

MORE DETAILED DESCRIPTION

Figure 1:
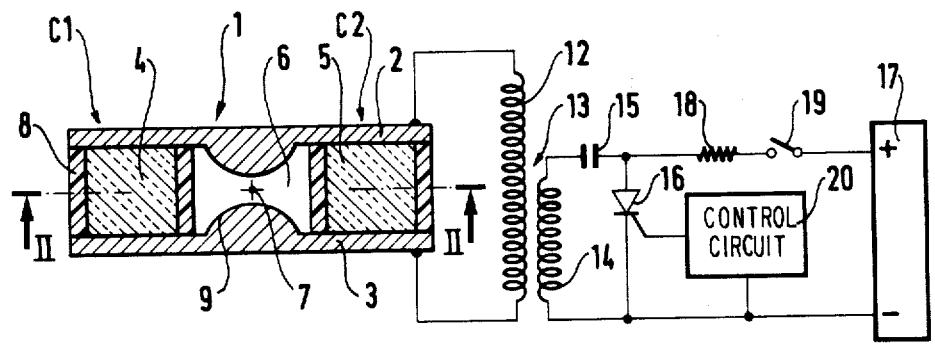
FIG. 1 schematically illustrates a first embodiment of the laser in accordance with the invention, a transversal cross-section of the laser body being shown.
Figure 2:
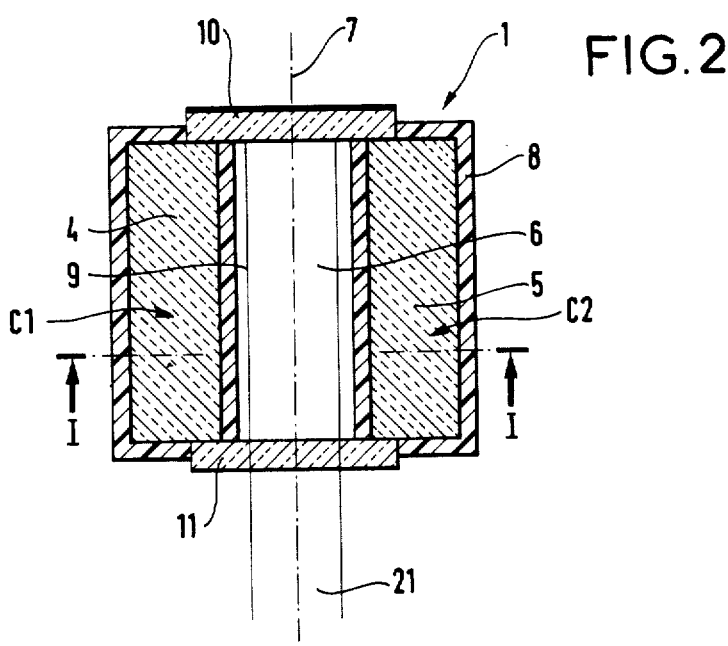
FIG. 2 is a longitudinal cross-section of the laser body along a plane II—II of FIG. 1.

FIG. 1 is a cross-setion of a laser body 1 along a plane I—I of FIG. 2. Said laser body has two rectangular steel plates 2 and 3 which are spaced parallel to and face each other.

Two parallelepipedal dielectric members 4 and 5 are fixed between the plates 2 and 3. The members 4 and 5 are disposed parallel to each other and are spaced from one another so as to provide a longitudinal passage 6 between these members which has an axis 7 perpendicular to the plane of FIG. 1. The members 4 and 5 are preferentially constituted by blocks made of a ferroelectrical ceramic substance with a high dielectric constant, e.g. barium titanate. The outer surfaces of the members 4 and 5 which are not in contact with the plates 2 and 3 may be covered with a layer of epoxyde resin 8. The plates 2 and 3 therefore form the plates of two capacitors $C_1$ and $C_2$ connected in parallel, the dielectrics of these capacitors being the members 4 and 5.

The middle portions of the plates 2 and 3 which are not in contact with the members 4 and 5 each have a round protruding portion 9 with a cylindrical surface and parallel to the axis 7. These protruding portions extend into the passage 6 so as to form the edges of two electrodes which face each other.

An optical resonant cavity is disposed in the direction of the axis 7. As can be seen in FIG. 2, said cavity has two mirrors 10 and 11 fixed by bonding to the ends of the passage 6 so as to close it. The mirror 10 is a totally reflecting mirror and the mirror 11 is partially transparent to laser radiation.

The ends of a secondary winding 12 of a transformer 13 are connected respectively to the two metal plates 2 and 3. One end of the primary winding 14 of the transformer 13 is connected to a plate of a capacitor 15 whose other plate is connected to the anode of a thyristor 16 which cathode is connected to the other end of the winding 14. The common point to the capacitor 15 and the thyristor 16 is connected to the positive pole of an electric current source 17 via a charging resistor 18 and a switch 19. The negative pole of the generator 17 is connected to the cathode of the thyristor 16. Both outputs of a control circuit 20 are connected respectively to the cathode and to the control electrode of the thyristor 16.

The laser described hereinabove and illustrated in FIGS. 1 and 2 operates as follows.

The inside volume of the passage 6 is filled with an active laser gas which, in the example illustrated, is a mixture of nitrogen and of sulphur hexafluoride $SF_6$ but could also be a mixture of halogens and rare gases.

With the thyristor 16 remaining off, the capacitor 15 is charged by turning on the switch 19. Then the capacitor 15 is made to discharge into the winding 14 by turning the thyristor 16 on under the control of the circuit 20. This discharge causes an induced voltage to be formed in the secondary winding 12 of the transformer 10 13, said induced voltage charging the two capacitors $C_1$ and $C_6$ of the laser body 1 which are connected in parallel.

As soon as the voltage between the plates 2 and 3 reaches the priming voltage between the electrodes 9 of the laser, a discharge is set up between these electrodes so as to cause an oscillating laser radiation in the cavity 10-11 which radiation gives rise to a laser pulse 21 leaving the mirror 11.

By way of indication, the capacitor 15 may be charged at a voltage which lies between 100 and 500 volts, the two capacitors being charged at the end of an interval of time of about 0.1 to 10 microseconds, after the command to discharge the capacitor 15. The proportion of $SF_6$ in the laser gas is adjusted to about 1% to vary the priming of the discharge between the electrodes: the higher the proportion of $SF_6$, the higher the priming voltage. The capacitors discharge in a very short time (about one nanosecond).

It is thus possible to trigger the laser very frequently, i.e. at a frequency of more than 100 kHz during operation.

In this case, it is necessary to set up an active gas flow in the passage 6 by means of a known system, not illustrated.

The laser illustrated in FIGS. 1 and 2 is highly reliable and has long service life since the unit which causes the discharge of the capacitor 15 into the winding 14 is a controllable rectifier which includes a semiconductor and which suffers practically no wear. The thyristor 16 can be replaced by a transistor or by a field effect transistor. This makes it possible to further increase the operation rate of the laser.

It is observed that the efficiency of the laser (laser beam energy/energy stored in the capacitors) is greatly increased. The efficiency is greater than 2%, the energy stored in the capacitors being 40 millijoules and the energy of the laser beam being 100 microjoules.

Figure 3:
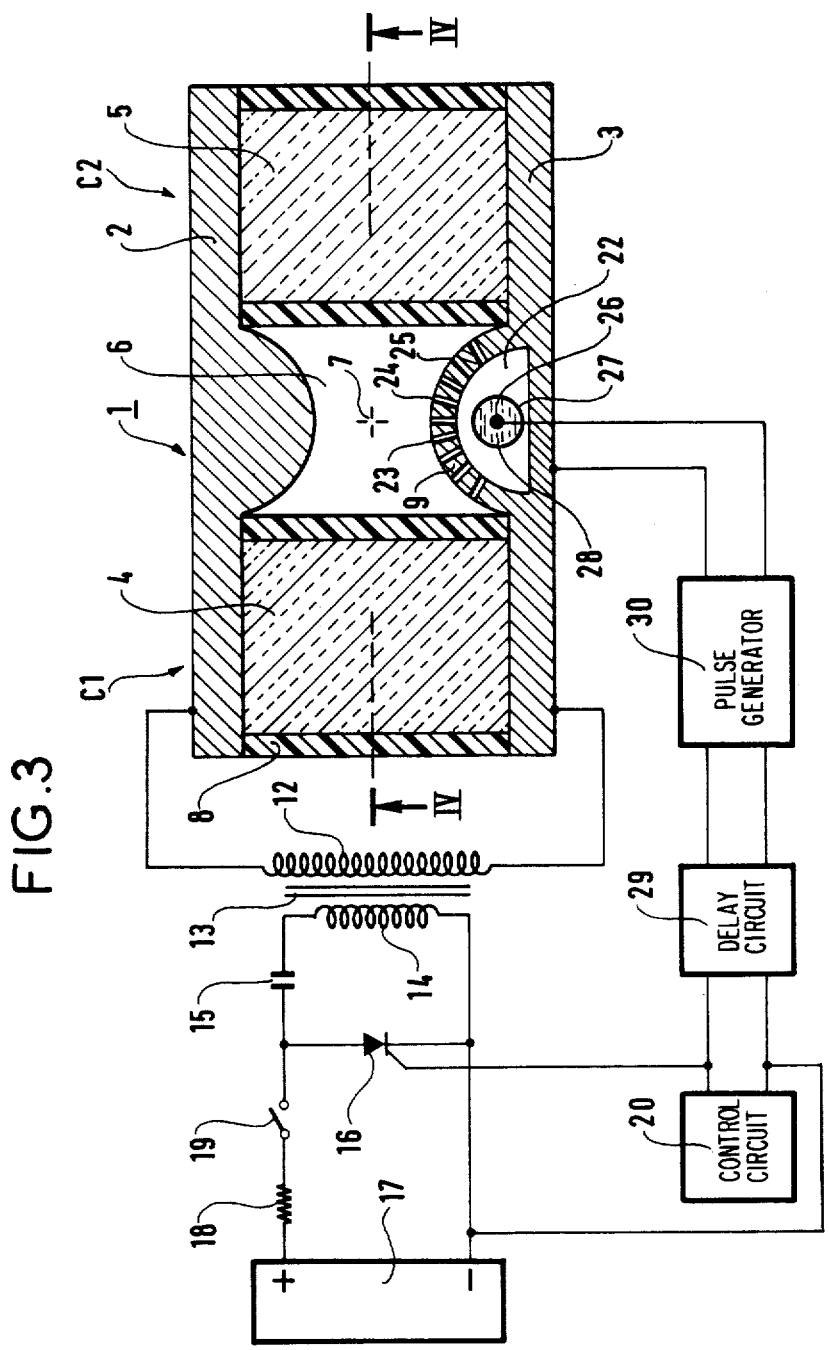
FIG. 3 illustrates a second embodiment of the laser in accordance with the invention, a transversal cross-section of the laser body being shown.
Figure 4:
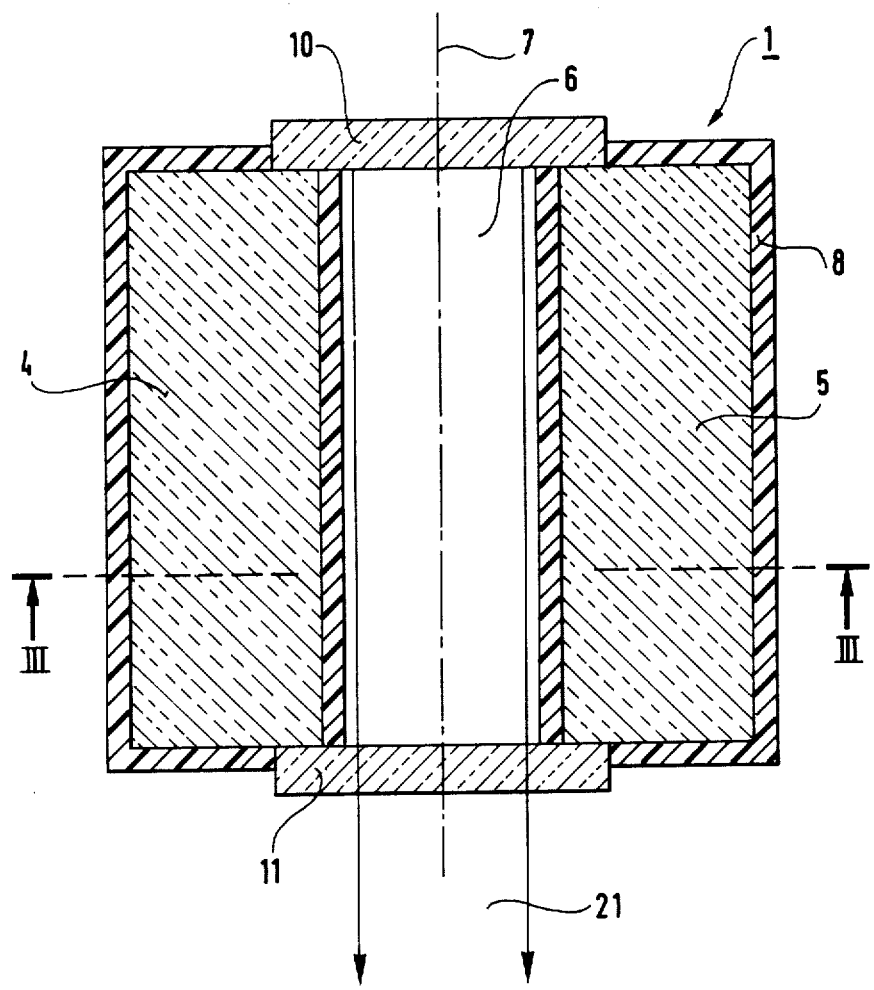
FIG. 4 is a longitudinal cross-section of said laser body along a plane IV—IV of FIG. 3.

FIGS. 3 and 4 show another embodiment of a laser in accordance with the invention, said embodiment having members analogous to those of the laser illustrated in FIGS. 1 and 2, these members bearing the same reference numerals as before.

In FIG. 3, a laser body 1 of which a cross-section through a plane III—III of FIG. 4 is shown has two rectangular steel plates 2 and 3 which are spaced, substantially parallel to and facing each other.

Two parallelepipedal dielectric members 4 and 5 are fixed between the plates 2 and 3. The members 4 and 5 are disposed parallel to each other and are spaced from one another so as to provide a longitudinal passage 6 between these members which has an axis 7 perpendicular to the plane of FIG. 3. The members 4 and 5 are preferentially constituted by blocks made of a ferroelectrical ceramic substance with a high dielectric constant, e.g. barium titanate. As illustrated, the outer surfaces of the members 4 and 5 which are not in contact with the plates 2 and 3 may be covered with a layer of epoxyde resin 8. The plates 2 and 3 form the plates of two capacitors $C_1$ and $C_2$ connected in parallel, the dielectrics of these capacitors being the members 4 and 5.

The middle portions of the plates 2 and 3 which are not in contact with the members 4 and 5 each have a round protruding portion such as 9. The protruding portions extend into the passage 6 along cylindrical surfaces whose axes are parallel to the axis 7 so as to form the edges of two electrodes which face each other.

One of these electrodes has a hollow inside 22 and the protruding portion 9 of said electrode has a plurality of openings such as 23, 24, 25, all over its surface. These openings make the passage 6 communicate with the hollow inside 22.

An insulated conductor constituted by a nickel wire 26 disposed inside a glass tube 27 which also contains a conductive solution 28 is disposed within the hollow inside 22.

An optical resonant cavity is disposed along the axis 7. The cavity has two mirrors 10 and 11 (FIG. 4) fixed by glueing to the two ends of the passage 6 so as to close it. The mirror 10 is a totally reflecting mirror and the mirror 11 is partially transparent to laser radiation.

The two ends of the secondary winding 12 of a transformer 13 are connected to the two metal plates 2 and 3 respectively. One end of the primary winding 14 of the transformer 13 is connected to one plate of a capacitor 15 whose other plate is connected to the anode of a thyristor 16 whose cathode is connected to the other end of the winding 14. The connection between the capacitor 15 and the thyristor 16 is connected to the positive pole of a DC electricity generator 17 via a charging resistor 18 and a switch 19. The negative pole of the electricity generator 17 is connected to the cathode of the thyristor 16.

The two outputs of a control circuit 20 are connected firstly to the control electrode of the thyristor 16 and to the negative pole of the electricity generator 17 respectively and secondly to the input of a delay circuit 29 whose output is connected to the input of a high-tension pulse generator 30 whose outputs are connected to the wire 26 and to the plate 3 respectively.

The laser described hereinabove and illustrated in FIGS. 3 and 4 operates as follows.

The inside volume of the passage 6 is filled with an active laser gas, e.g. nitrogen.

While the thyristor 16 is off, the capacitor 15 is loaded by turning the switch 19 on. Then, discharge of the capacitor 15 into the winding 14 is triggered by energizing the circuit 20 which turns the thyristor 16 on. Said discharge causes an induced voltage to be formed in the secondary winding 12 of the transformer 13 which induced voltage progressively charges the two parallel-connected capacitors $C_1$ and $C_2$.

Energizing the circuit 20 also triggers a high-tension pulse delivered by the electricity generator 30 after a time interval determined by the delay circuit 29. The delay of the circuit 29 is adjusted so that the high-tension pulse is delivered before the charging of the capacitors $C_1$ and $C_2$ reaches the priming tension between the laser electrodes.

As soon as the high-tension pulse is delivered, a corona discharge is formed around the insulating tube 27 which surrounds the conductor 26. Ionization of the active gas due to said corona discharge immediately causes an electric discharge between the two laser electrodes. Under the effect of this discharge, a laser radiation oscillates between the two mirrors 10 and 11 of the cavity. Said radiation generates a laser pulse 21 which leaves the mirror 11..

In practice, the delay of the circuit 29 is adjusted so that the corona discharge occurs at a predetermined capacitor charging voltage which is a little lower than the triggering voltage. However, it should be observed that said predetermined voltage is not critical and that the electric discharge triggered by the corona discharge can be obtained for a predetermined voltage five times lower than the priming voltage.

Said electric discharge is particularly stable and homogenous and its voltage is constant. The advantage of the laser illustrated in FIGS. 3 and 4 over the one illustrated in FIGS. 1 and 2 is that it has an energy output which may be about 5 to 10 times greater. Further, better stability of the laser energy, greater precision in timing the triggering of the laser pulses and a great reduction in the emitted radioelectric interference level are observed.

Of course, the insulated conductor can be disposed not only inside a hollow electrode in the form of a grating as in the case of the embodiment described, but also more simply inside in the laser passage near an electrode and parallel to the axis of the passage.

Further, the active gas can be constituted by a mixture of halogens and of rare gases so as to produce excimer lasers.

Lastly, it is possible to make an active gas flow in the passage by means of a known system, mainly in the case where it is required to obtain laser pulses at a high repetition rate.

The laser in accordance with the invention can be used to excite dye lasers.

We claim:

1. A gas laser in which the gas is excited by discharges from capacitors, said laser comprising:
    two spaced opposed metal plates;
    two spaced dielectric members with high dielectric constant disposed between said plates, and defining a hollow volume along an axis;
    two spaced opposed mirrors closing off said hollow volume along said axis and forming with said metal plates and said dielectric members an optical resonant cavity, said cavity containing an active laser gas;
    one of said mirrors being partially transparent to laser radiation and forming a laser beam output;
    said dielectric members and said metal plates constituting two laser capacitors connected in parallel, the middle portions of said metal plates in contact with the active gas constituting laser-triggering electrodes; and
    a capacitor charging circuit for said laser capacitors, said circuit comprising:
        a transformer having a primary winding connected in series with a charging circuit capacitor and having secondary windings ends connected to respective ones of said two plates;
        a source of electric current for charging the charging circuit capacitor; and
        means for controlling the discharge of the charging circuit capacitor through the primary winding so as to generate an induced current in the secondary winding which induced current is capable of charging the laser capacitors so as to set up an electric discharge between the laser-triggering electrodes with said discharge exciting the active laser gas to form a laser beam.

2. A gas laser according to claim 1, wherein the middle portions which form the electrode each have a rounded protruding part which extends into the cavity.

3. A gas laser according to claim 1, wherein the dielectric members are ferroelectric ceramic components.

4. A gas laser according to claim 1, wherein said means for controlling the discharge of the capacitor in the primary winding of the transformer include a controllable rectifier with a semi-conductor and a circuit for controlling said rectifier.

5. A gas laser according to claim 1, wherein the active laser gas is a mixture of nitrogen and of sulphur hexafluoride.

6. A gas laser according to claim 1, further including:
    an insulated conductor disposed parallel to the axis in the active gas and near an electrode;
    a high-voltage generator of electric pulses having terminals connected to the conductor and to the electrode located near the conductor respectively; and
    a delay circuit connected to the input of the generator of electric pulses and to said means for controlling the discharging of the capacitor, including means to effect a delay predetermined so that said generator delivers a pulse before the charging voltage of the capacitors reaches the voltage at which priming occurs between the electrodes, whereby said pulse sets up a corona discharge around the insulator of the conductor to trigger electric discharges between the electrodes.

7. A gas laser according to claim 6, wherein at least one electrode has a rounded protruding part which extends into the cavity.

8. A laser according to claim 7, wherein:
    the electrode which has a protruding part is hollow;
    the protruding part has a plurality of openings through which the cavity communicates with the inside of the hollow protruding part; and
    wherein the insulated conductor is housed inside the protruding part.

* * * * *